July 10, 1923.
J. W. PRIMROSE
ANIMAL TRAP
Filed June 29, 1921
1,461,288
2 Sheets—Sheet 1
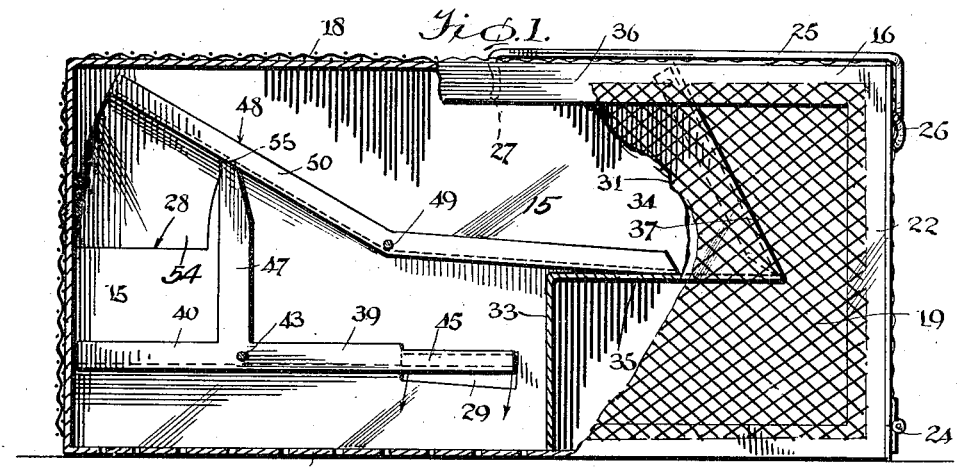
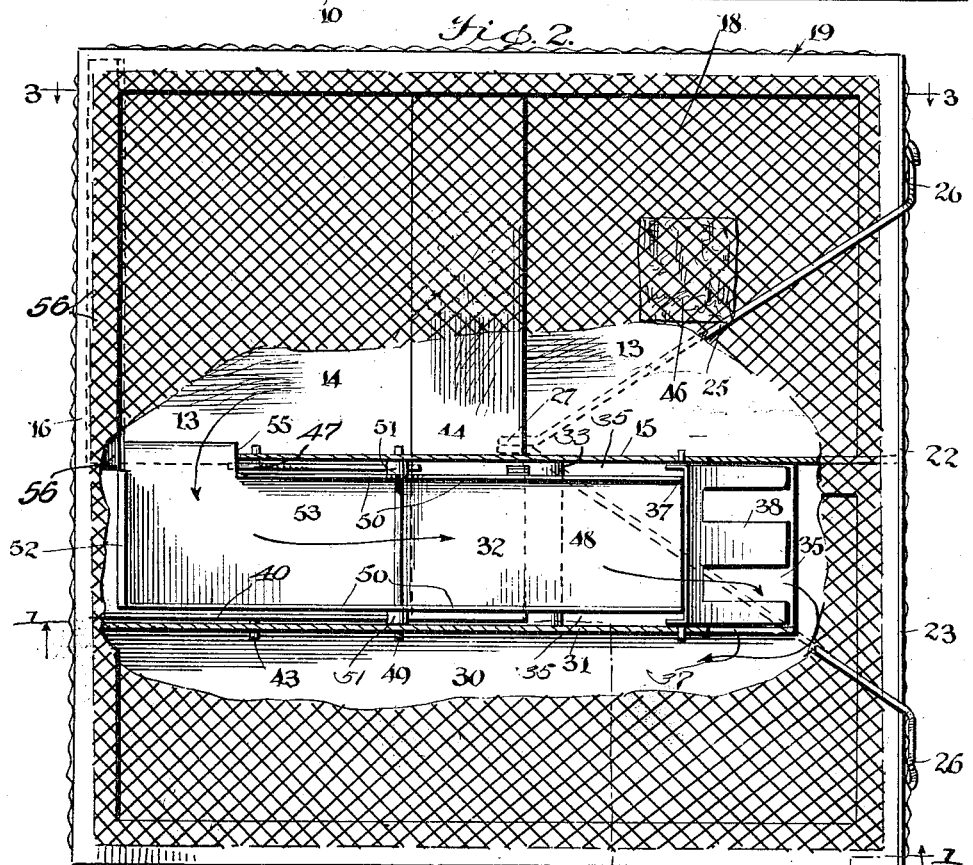
WITNESSES
INVENTOR
J. W. Primrose,
BY
ATTORNEYS

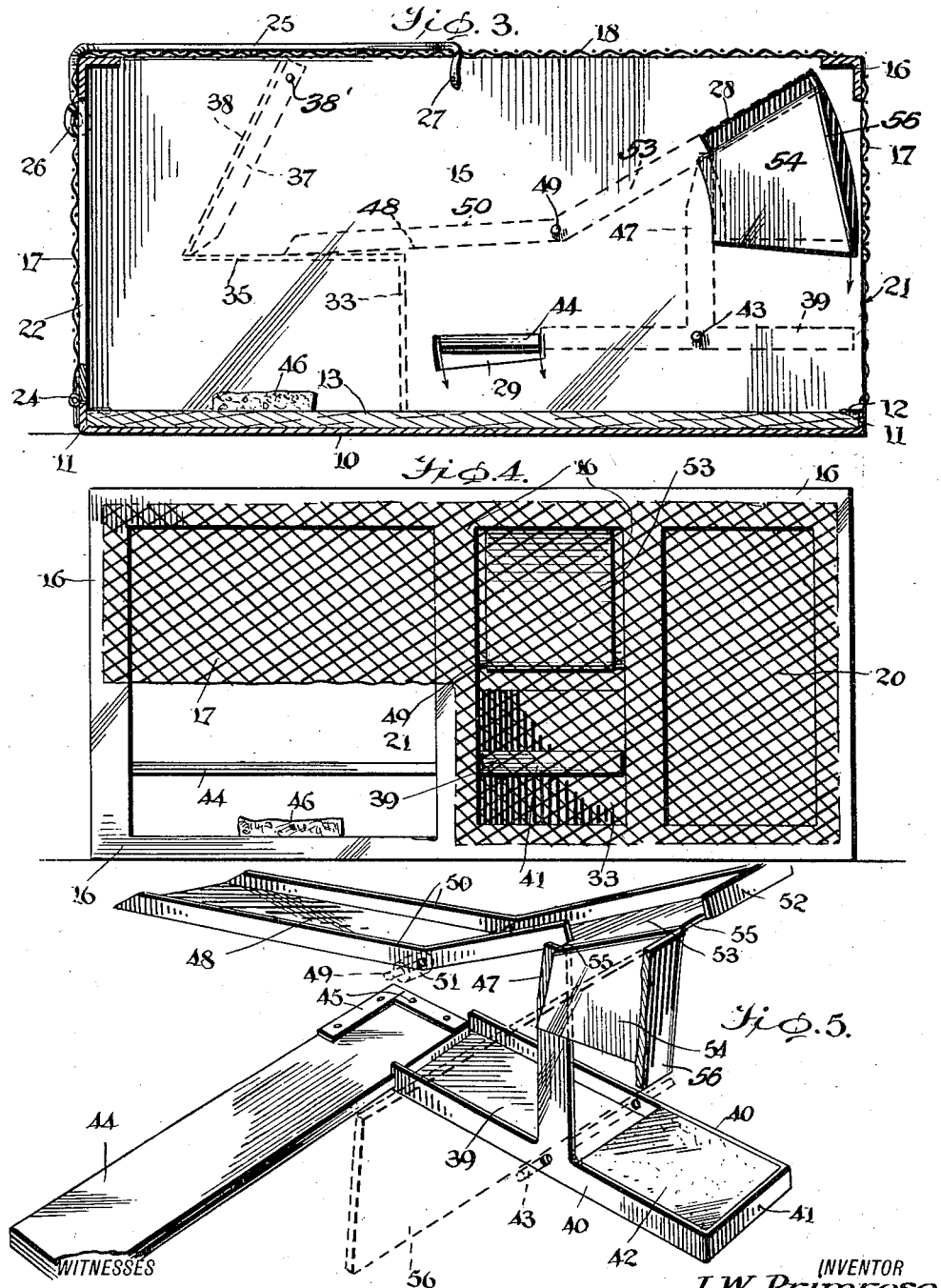

Patented July 10, 1923.

1,461,288

UNITED STATES PATENT OFFICE.

JOHN W. PRIMROSE, OF CLARKSDALE, MISSISSIPPI.

ANIMAL TRAP.

Application filed June 29, 1921. Serial No. 481,268.

*To all whom it may concern:*

Be it known that I, JOHN W. PRIMROSE, a citizen of the United States, and a resident of Clarksdale, in the county of Coahoma and State of Mississippi, have invented certain new and useful Improvements in Animal Traps, of which the following is a specification.

This invention relates to animal or rodent traps for catching rats, mice and the like and the object thereof is to provide a trap of the self and everset type, being always open for the entry of the rodent except immediately after an animal has entered and has closed the entrance opening prior to passing into the retaining chamber from the entrance chamber.

Another object of this invention is to provide a simple and novel mechanism for actuating the closing means for the entrance openings by means of a trip, which trip when actuated to close the entrance opening permits the animal to pass into the retaining cage or chamber, the device being free of all mechanism within the entrance chamber, thereby preventing fright of the animal and the floor of the chamber being of wood, since it is never cold or hot to the animal's feet, thereby lessening timidity.

A further object of the invention is to provide a trap which may be very economically produced from sheet metal, wire and wood and which is not likely to get out of working order, which is simple and which may be readily rebaited and discharged so as to empty the animals therefrom, the capacity of the device depending upon the size of the retaining chamber or cage, in view of the fact that the trap is always set for use and as above pointed out, constitutes a trap of the self set and everset type having a counter weight trigger by which each rodent controls its own destiny until caught or retained in the retaining cage or chamber from which escape is impossible.

Other and further objects of the invention will become readily apparent to persons skilled in the art, from a consideration of the following description when taken in conjunction with the accompanying drawings, wherein:

Figure 1 is a vertical sectional view taken on the line 1—1 of Figure 2 with the parts in the positions which they occupy when the entrance opening is uncovered.

The partition 15 in Figure 2 should be closed at the back portion adjacent to the trap door 38.

Figure 2 is a plan view partly in horizontal section.

Figure 3 is a vertical sectional view taken on the line 3—3 of Figure 2.

Figure 4 is a front elevation showing the entrance opening, and

Figure 5 is a perspective view showing the counter-weight and trigger and operating mechanism within the trap.

Figure 6 is a detail perspective view showing the partition 31 and its parts.

Referring to the drawings in detail, in which for purposes of illustration is illustrated the preferred embodiment of the invention and in which like reference characters designate corresponding parts throughout the several views, my improved trap is shown as embodying a bottom portion 10 of sheet metal having a flanged side portion 11, the outer edges of the bottom 10 being bent upwardly for this purpose and having at spaced points, inwardly extending or horizontally bent lugs 12 retaining a floor 13 of wood or the like in position so as to extend from the front to the rear and within the entrance chamber 14 to one side of the vertical partition 15 dividing the device transversely and vertically. The casing is in the form of an open frame 16 of angle iron, sheet metal or the like bent in right angular form and covered with screeen or wire mesh 17 at the top 18 and sides 19, as well as at the front portion 20, except that that portion in front of the entrance chamber 14 is cut away at the bottom to provide an entrance opening or inlet 21, the same terminating about mid-way or otherwise of the height of the casing at said front portion and entrance chamber so that the lower half is open to permit the entrance of the animals into the entrance chamber 14, according to size.

The purpose of providing the entrance chamber with the floor of wood or the like, is that the material is never excessively cold or excessively hot or warm to the animal's paws or feet, and thereby lessens timidity, thus obviating the likelihood of the animal making its exit or backing out. Furthermore, the entrance chamber is free of all mechanism, thereby preventing fright to the animal.

The back portion is provided with a screen door or closure 22 constituting the discharge door of the trap, the same comprising a frame 23 of sheet metal or the like hinged as shown at 24 to the upturned portion of the bottom at the edge of the floor and provided with means for retaining the same in a closed position at the free or upper end thereof, such fastening or catch means embodying a bail or yoke 25, preferably of V-shaped formation having the legs or extremities thereof secured to the door through the wire mesh or screen covering thereof, as indicated at 26 and bent at right angles from the side covered by the door, in a vertical plane, to a horizontal plane for engagement with the top 18, the free end or back portion being doubled and bent downwardly at right angles to the opposed sides in contact, to engage the wire mesh of the top 18 as indicated at 27. By this means, coupled with the resiliency of the wire, a spring catch is produced, which will retain the door or closure in a closed position, while permitting the same to be opened freely when desired, in order to empty the trap, discharging the animals therefrom, or to rebait.

Adjacent to the entrance end of the entrance chamber or forward end of the vertical partition 15 and in rear of the screen 17 above the entrance opening 21, said partition or vertical wall is provided with an arcuate slot or opening 28, and near the bottom thereof and intermediately of its ends with a relatively narrow arcuate slot or opening 29, the axes of said slots being disposed in opposite directions for a purpose to hereinafter more fully appear. Disposed in spaced parallel relation to the vertical wall or partition 15 which entirely divides the entrance chamber 14 from the catching or retaining chamber or cage designated at 30, is a vertical wall or partition 31 forming therewith a passage or run-way 32, said wall 31 terminating in spaced relation to the back of the closure forming the cage of the trap or casing, as above described and bent at right angles toward the partition or wall 15 to provide a vertical end portion 33, the upper portion projecting rearwardly as indicated at 34, and having a bottom portion 35 contiguous with the end wall 33 while the partition or wall 31 is bent horizontally to form the top portion 36 which is joined to the partition 15 to entirely close off the run-way 32 above referred to. At the rear end of the run-way, the partition 31 is provided with the sloping end 37 at the top of which is pivoted as at 38' a swinging trap door 38 of slotted sheet metal, wires or the like so as to swing upwardly and rearwardly toward the rear closure 22, the light being visible through the openings in the trap door, which automatically drops to a closed position upon being released, and which by reason of closing at an angle inclined upwardly and forwardly or rearwardly and downwardly, prevents the return of the rodent from the retaining cage to the entrance chamber or compartment 14, after the animals have passed from the latter to the former in a manner to be hereinafter more fully set forth.

Pivoted between the spaced walls or partitions 15 and 31 is a counter-weighted trigger 39 in the form of a flat plate or piece of metal of elongated formation having side flanges 40 and an end flange 41 retaining the counter weight 42 in position at the forward end thereof and engaged by a horizontal transverse pivot 43 extending through horizontally aligned or registering apertures in said partitions or walls in horizontal alignment or in the same horizontal plane as the top edge of the opening 29 and forwardly thereof, said pivot preferably extending through openings in the side flanges or walls 40 of the trigger so that a portion of the latter extends forwardly of the pivot and is normally weighted down by the counter-weight 42 by reason of the counter-balance thus provided, and the other portion extending rearwardly where said side flange 40 and the rear end flange or wall are bent downwardly to form a retaining means for the inner end of a platform or treadle 44, as indicated at 45. This platform or treadle is preferably of wood and extends at right angles to the trigger proper, but constitutes a part thereof, while the opposite or free end thereof which extends outwardly is disposed through the arcuate slot or opening 29 and extends into and across the entrance chamber or compartment 14 spaced from the floor 13 thereof, the bait being disposed in rear of the treadle, as indicated at 46, although the treadle may be used for this purpose if desired to act as a lure for the mice, rats or other rodents or animals of like kind, to enter the trap through the entrance opening 21 but in such a manner that the bait would be inaccessible, instead of disposing the same upon the bottom in rear of the treadle or platform 44 where the bait is accessible.

The trigger is normally weighted down at its forward end by means of the weight 42 overbalancing the rear portion and treadle or platform 44 and the latter is adapted to be tread upon by the animal so as to depress the same to release the trigger in order that the animal may pass from the entrance chamber 14 to the retention chamber 30. For this purpose, the trigger is provided with an upstanding lug 47 at one side disposed adjacent to the inner face of the partition or wall 15 and having the upper end thereof beveled at its rear edge to form a taper and a narrow upper edge. This upright or trigger is preferably formed with the sheet of metal producing the trigger and extends from the flange or side wall 40 immediately in the rear of the concaved inner end wall of the arcuate slot or opening 28 as clearly shown in Figures 1 and 3 of the drawings. Pivoted between the walls or partitions 15 and 31 is a tread or run-way 48 of angular or obtuse-angled formation and pivoted at the angular or bent portion thereof, as indicated at 49. This pivot is in the form of a pin extending through the opposed sides or flanges 50 of the tread or runway 48, the opposite sides of which are turned upwardly like the trigger 39, so as to add rigidity and strength thereto, and is provided with opposed registering apertures for receiving the pivot pin or pintle which is disposed through corresponding horizontally aligned apertures in the partitions or walls 15 and 31 concentric to the inner and outer edge walls of the slot or opening 28 and between and above the slot or opening 29 and the pivot 43, and the trigger and treadle or platform so as to extend substantially the full length of the run-way 32, as clearly shown in Figures 1, 2 and 3 of the drawings. A collar or sleeve 51 is provided on the pivot 49 between the side flange 50 disposed toward the partition or division wall 15 and between 50 and 31 as clearly shown in Figure 2, thus holding the tread or flooring portion 48 spaced from said partition, while the forward end of the tread is provided with an end wall 52 and the opposite end is freely open to the exit end of the run-way adjacent to the trap door 38. At one side of the tread 48 adjacent to the forward end thereof, the same is provided with an opening or recess 53 and an arcuate portion extending downwardly at right angles therefrom as indicated at 54 constituting means for partially covering in its closed position the arcuate slot or opening 28 and for uncovering the same, as well as producing the bottom shoulder by reason of the outwardly projecting portion or flange 55, beneath which the upright or trigger lug 47 normally engages to hold the tread in the position shown in Figures 1 and 2. At the forward edge of the downwardly extended portion 54 which forms a door or closure for the slot or opening 28 it is provided with a vertical wing or extension 56 extending laterally adjacent to the front portion of the wire mesh 17 above the inlet or entrance opening 21 and adapted to cooperate with the latter as a closure.

Thus it will be seen that when the trigger is held down by the weight 42, the upright or lug 47 will engage beneath the shoulder or extension flange 55 thus holding the tread raised at its front end and lowered at its rear end in contact with the bottom portion 35 of the run-way, the portion 54 thus covering the lower portion of the slot or opening 28 constituting an escape opening from the entrance chamber into the run-way and retaining chamber or cage, except the upper portion thereof, which is left open or uncovered in order to prevent the animal from being pinched or caught, as will be apparent from an inspection of Figure 3 of the drawing. The closure formed by the extension or wing 56 will thus be raised and uncover the opening 21. Therefore, upon the animal entering the trap through the opening 21 and walking or treading upon the platform or treadle 44, the latter will be depressed so as to actuate the trigger on its pivot 43 in such a manner as to release the upright or lug 47 from beneath the flange or shoulder 55 of the tread, the lug or upright swinging rearwardly in its oscillatory movement for this purpose but automatically returning to a set position forwardly displaced, when released, thereby automatically setting the trap and producing a trap of the self-set and automatically set type. When the tread is released, it will drop by its weight at the forward end thereof, the same being counterweighted by means of the portions 54 and 56 of said ends, and thus dropping to close the opening 21 and uncovering the opening or slot 28. The animal may then pass through the opening 28 onto the run-way and upon the tread 48, finally making escape through the trap door 38 into the retention chamber or compartment designated 30 from whence no escape is possible, unless the discharge door 22 is opened by disengagement of the catch, as previously described. Upon the trigger being released as above explained, the upright or lug 47 will at its forward edge engage the shoulder 55 at the rear end thereof, and prevent further rocking of the trigger or depression of the tread or runway 48 and as long as an animal is upon the tread 48 forwardly of the pivot 49 thereof, the door 56 will remain closed and the portion 54 will uncover the slot or opening 28. However, as the animal passes rearwardly upon the tread, the rear portion thereof will be lowered from its raised position rearwardly of the pivot 49 and the portion thereof disposed in angular relation with respect thereto at the forward portion will be raised, thus closing the run-way at the front and covering the opening 28, when the lug or upright 47 will again engage beneath the shoulder 55 and prevent the return of the animal to the entrance chamber. The only escape being to the rear through the trap door, it will be seen that the animal will thus be effectively caught. It may also be pointed out that the counter-weight of the trigger 39 is to be so weighted that no animal can throw it, if said animal cannot likewise set the trap by its own weight.

In view of the foregoing, it is thought that the operation of the device will be readily understood and in view of the simplicity and practical value that it will readily commend itself to those skilled in the art.

Having thus described the invention, what I claim is:—

1. In an animal trap, a cage comprising a frame having a reticulated covering, a metallic bottom and a non-metallic flooring, said cage being provided with an entrance opening in one side and extending partly across the same, a door closure for the back of the cage, means for holding said door in a closed position, a covered run-way dividing the cage to one side of the door opening, a trap door controlling the exit thereof, said run-way dividing the cage into an entrance compartment and a retaining compartment, a trigger for holding the door open, and a tripping device cooperating with the trigger to disengage the latter whereby the door will close, said trigger comprising a pivoted run-way connected to the door, a portion connected to the trip and having a lug engaging the pivoted portion to hold the same in position with the door open and adapted to release the same to permit the door to close, said run-way having spaced walls, one of said walls covering the vertical area of the cage, a partition forming a part of said runway, and having an opening therein leading from the entrance compartment to the retaining compartment, and a door member having a covering portion co-operating with said opening.

2. In an animal trap, a cage comprising a frame having a reticulated covering, a metallic bottom and a non-metallic flooring, said cage being provided with an entrance opening in one side and extending partly across the same, a door closure for the back of the cage, means for holding the door in a closed position, a covered run-way dividing the cage to one side of the door opening, a trap door controlling the exit thereof, said run-way dividing the cage into an entrance compartment and a retaining compartment, a trigger for holding the door open, and a tripping device co-operating with the trigger to disengage the latter whereby the door will close, said trigger comprising a pivoted run-way connected to the door a portion connected to the trip and having a lug engaging the pivoted portion to hold the same in position with the door open and adapted to release the same to permit the door to close, said run-way having spaced walls, one of said walls covering the vertical area of the cage, a partition forming a part of said runway, and having an opening therein leading from the entrance compartment to the retaining compartment, and a door member having a covering portion co-operating with said opening, said trip being fixed to the trigger and extending laterally through the partition into the entrance chamber and across the same for movement adjacent to the floor thereof, said trip when depressed serving to move the trigger on its pivot to disengage the lug thereof from the pivoted portion whereby the door and covering will move downwardly, the door serving to close the entrance opening and the covering portion uncovering the opening, said door when open being raised and the covering portion leaving the upper portion of its opening uncovered, substantially as and for the purposes specified.

3. An animal or rodent trap comprising a casing, said casing being closed on all sides and having a front entrance opening, a rear closure door and means to hold the same in a closed position, a partition dividing the casing transversely and forming an entrance compartment, in the rear of the opening and a retaining chamber at the opposite side thereof, a second partition spaced from the first partition and having an outlet into the retaining cage, a trap door controlling said outlet and opening in one direction only into the casing and closed against opening in the opposite direction, a pivoted angular tread between the partitions having a side opening and a shoulder portion, a door closure for the entrance opening and having a rearwardly bent vertical portion connected to the tread at the shoulder portion, there being a slot through the first partition partly covered by said vertical portion, a weighted trigger pivotally mounted between the partitions beneath the tread, and having an upright to engage the shoulder and hold the tread elevated, said upright being movable in the slot, said tread when raised serving to open the closure door and close the vertical portion except at the top of its opening, said first partition having a second slot and a treadle extending laterally from the opposite end of the trigger and movable through the slot whereby upon the same being depressed by the animal treading thereon, the arm will be disengaged from the shoulder to permit the tread to move downwardly at the front and upwardly at the rear against the escape of the animal from the cage after passing from the entrance compartment to the opening in the partition first named and over said tread.

4. In an animal trap, a cage comprising a frame having a reticulated covering, a metallic bottom and a non-metallic flooring, said cage being provided with an entrance opening in one side and extending partly across the same, a door closure for the back of the cage, means for holding the door in a closed position, a covered run-way dividing the cage to one side of the door opening, a trap door controlling the exit thereof, said run-way dividing the cage into an entrance compartment and a retaining compartment, a trigger for holding the door open, and a tripping device co-operating with the trigger to disengage the latter whereby the door will close, said trigger comprising a pivoted runway connected to the door, a portion connected to the trip and having an upright lug engaging the pivoted portion to hold the same in position with the door open and adapted to release the same to permit the door to drop and close by its weight when the trip is depressed.

5. An animal or rodent trap comprising a casing, said casing being closed on all sides and having a front entrance opening, a rear closure door and means to hold the same in a closed position, a partition dividing the casing transversely, and forming an entrance compartment in the rear of the opening and a retaining chamber at the opposite side thereof, said entrance compartment having a wood flooring, there being an opening through the partition, a wall spaced from the first wall and forming a runway, an angular tread pivoted between said walls, said runway having an overhanging bottom portion at the back upon which the tread rests when in position to close the front of the runway, a trap door for the rear end of the run-way, simultaneously actuable doors for said entrance opening and said last named opening, a trigger adapted to hold said doors downwardly in position and when actuated to release the same so that the first door will close when the latter door is open, said tread adapted to drop beneath said partition opening, and a wooden trigger arm extending into the entrance compartment for releasing the trigger and doors when the animal treads thereon.

JOHN W. PRIMROSE.